Sept. 1, 1925.  1,552,169
L. C. KENEN
POWER UNIT FOR MOTOR VEHICLES
Filed Dec. 15, 1916   2 Sheets-Sheet 2

Inventor
Leonard C Kenen
By Whittemore Hulbert & Whittemore
Attorneys

Patented Sept. 1, 1925.

1,552,169

UNITED STATES PATENT OFFICE.

LEONARD C. KENEN, OF DETROIT, MICHIGAN, ASSIGNOR TO GEORGE W. DUNHAM, OF DETROIT, MICHIGAN.

POWER UNIT FOR MOTOR VEHICLES.

Application filed December 15, 1916. Serial No. 137,249.

*To all whom it may concern:*

Be it known that I, LEONARD C. KENEN, a citizen of the Republic of France, residing at Detroit, in the county of Wayne and State of Michigan, have invented certain new and useful Improvements in Power Units for Motor Vehicles, of which the following is a specification, reference being had therein to the accompanying drawings.

The invention relates to power units for motor vehicles, and it is the primary object of the invention to reduce the size and weight of the unit required for the development of a predetermined power. Further objects are to secure more perfect balance, and improved and simplified features of construction as hereinafter set forth.

Figure 1:
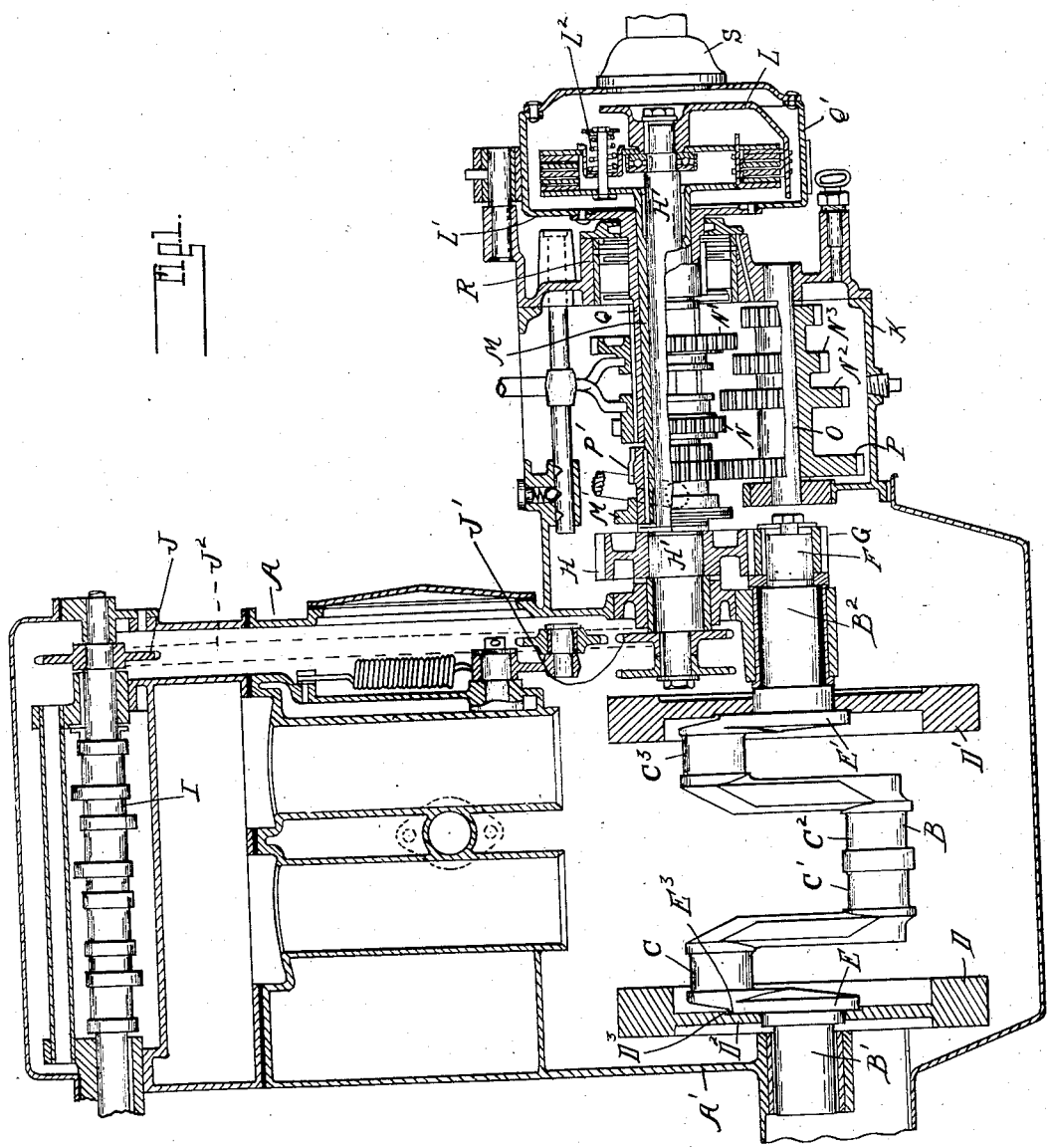
Figure 1 is a vertical central, longitudinal section through the unit.
Figure 2:
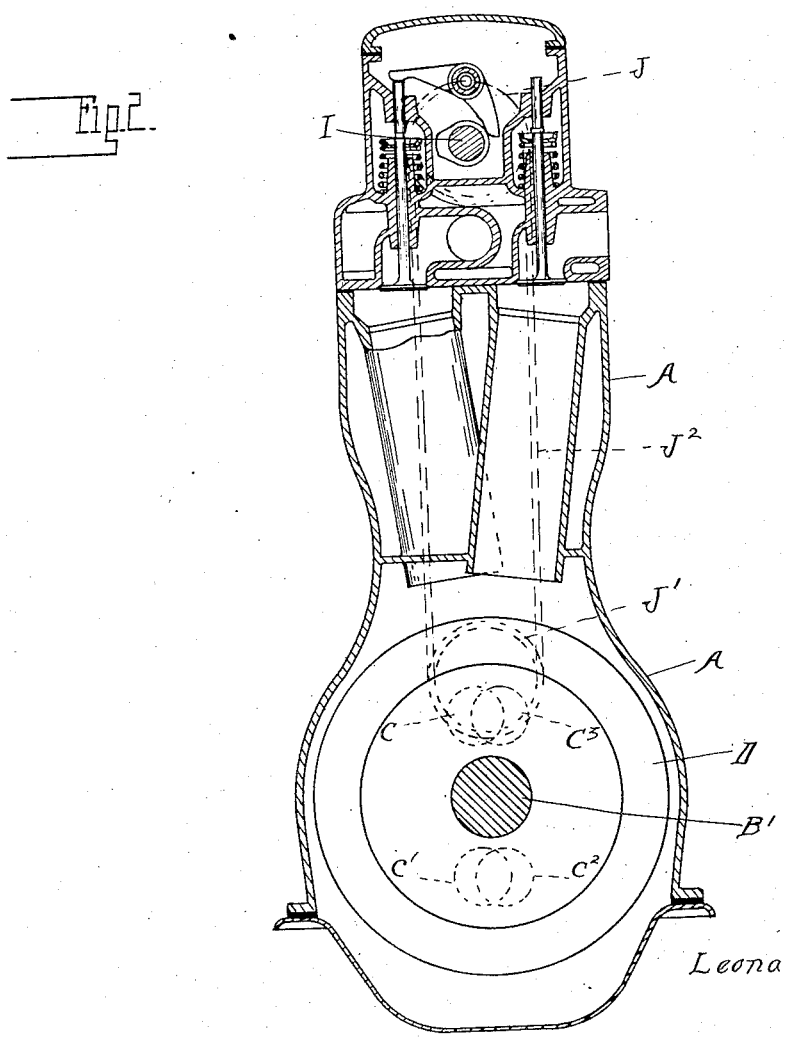
Figure 2 is a cross section.

In the present state of the art power units for motor vehicles usually comprise an engine, a fly-wheel, a clutch and a variable speed transmission. The engine is provided with a cam-shaft for controlling the valves thereof, which is usually driven from the crank-shaft in the speed ratio of 2:1, while the transmission is usually directly clutched to the engine shaft to rotate therewith at high speed. When high-speed engines are employed it is difficult to obtain perfect balance, while the high angular velocity of the transmission-shaft is also detrimental. Furthermore, to obtain the proper axle speed a higher ratio of reduction between the transmission-shaft and axle is necessary, which increases the size of the bevel gears and consequently the size of the axle housing. One of the features of the present improvement is the construction in which the engine and transmission constitute a single unit in which the maximum speed of the transmission is reduced from that of the engine crank-shaft, preferably in the ratio of 2:1. The cam-shaft is also driven from the transmission-shaft instead of from the crank-shaft and in a 1:1 ratio. Instead of arranging the fly-wheel outside of the engine crank-case and at one end of the crank-shaft, a divided fly-wheel is employed, the members of which are arranged at opposite ends of the crank-shaft and preferably within the crank-case. In place of arranging the clutch between the engine and the transmission-gearing it is positioned outside of the transmission gear housing, while the latter preferably consists of an integral extension of the engine housing. By reason of these changes greater compactness and stability is secured, while the high-speed of rotation is confined to the engine crankshaft and is not imparted to the transmission. This permits of using the standard ratios of gear reduction in the transmission and axle, such as are employed with engines of moderate speed.

In detail, A is the engine housing, comprising a plurality of cylinders, which as shown are four in number. Instead, however, of being arranged in a common plane, the cylinders are in groups of two, which are in planes in angular relation to each other, thereby permitting a decrease in the length of the engine. B is the crank-shaft provided with journal bearings B' and B² at opposite ends thereof and having the intermediate cranks C C' C² and C³. The cranks C' and C², which are upon the same throw, are laterally offset in relation to each other sufficiently to compensate for the angular relation of the pairs of engine cylinders, and the cranks C and C³ on the opposite throw are similarly offset. D and D' are the engine fly-wheels, preferably arranged adjacent to the journal bearings B' and B² inside of the crank-case A'. These fly-wheels may be mounted upon the crank-shaft by providing the latter with flanged portions E and E', which are bolted or otherwise secured to the fly-wheel web D². Concentric shoulders D³ and E³ are preferably formed upon the webs D² and flanges E E', to properly align the fly-wheels with the axis of the crank-shaft.

Beyond the bearing B² at the inner end of the crank-shaft is an extension F of said shaft on which is mounted a pinion G. This pinion is in mesh with a gear-wheel H upon a parallel shaft H', constituting the driving shaft of the transmission. The pinion G and gear-wheel H are preferably in the ratio of 1:2, so that the shaft H' rotates at one-half the speed of the crank-shaft. I is the cam-shaft for controlling the engine valves, which is arranged at the upper end of the cylinders and which is preferably driven through the medium of sprockets J J' and sprocket-chain J² from the shaft H' and in a 1:1 ratio.

To avoid the necessity of positioning the clutch intermediate the engine crank-shaft and the driving transmission shaft, the shaft H is extended through the transmission gear housing K and has mounted on its outer end one member L of the clutch, which as shown is of the multiple disk type. The cooperating member L' of the clutch is mounted on a tubular shaft M sleeved upon the shaft H' and longitudinally adjustable thereon. L² are springs for yieldably drawing the clutch members L and L' into frictional engagement, and M' is the clutch collar which is arranged at the inner end of the shaft M to be operated by suitable mechanism (not shown) for releasing the clutch. The several speeds of the transmission are obtained through the gear-wheels N N' splined upon the sleeve Q and cooperating gear-wheels N² and N³ upon a countershaft O, which latter may be arranged in axial alignment with the crank-shaft. P is a gear-wheel connected with the gear-wheels N² N³, which is in mesh with a gear-wheel P' upon the shaft M. Q is a sleeve surrounding the tubular shaft M and journalled in a concentric bearing R in the transmission gearing housing K. The sleeve Q is expanded outside of the casing K to form a housing Q' for the clutch and the periphery of this housing may be employed as a brake-drum. S is a universal coupling between the housing Q' and the propeller-shaft (not shown), by which the axle is driven.

With the construction as described, when the engine is in operation the rotary movement of the crank-shaft is transmitted through the gears G and H to the shaft H', which together with the clutch member L will be constantly driven but at one-half crank-shaft speed. When the clutch is released by movement of the clutch collar M' the gears N N' may be shifted to produce any desired speed ratio, and upon re-engagement of the clutch, motion is transmitted through these gears, the pinion P and intermeshing gear-wheel P' to the sleeve Q, housing Q' and universal coupling S. For high speed the shaft M is directly clutched to the sleeve Q, which will drive the latter at the same speed as the shaft H' or at one-half crank-shaft speed.

The arrangement of a pair of fly-wheels at opposite ends of the crank permits of reducing the diameter of said wheels and relieves the crank from torsional stresses and furthermore by arranging these fly-wheels within the crank housing and inside of the journal bearings B' and B², the transmission gearing is compactly arranged and may be conveniently housed in an integral case with the engine. There is also an advantage in placing the clutch beyond the transmission gearing, as it is more accessible for lubrication or repairs, while at the same time it will perform its normal function of a coupling between the engine and transmission gearing. Still other advantages are that the crank-shaft may be readily removed without disturbing the transmission. The arrangement of a pair of fly-wheels on opposite ends of the crank and inside of the supporting main bearing relieves the crank journals from torsional stress due to the unevenness of the power torque; also forms a symmetrical rotating body, thus tending to equalize the centrifugal couples which may exist in the system; provides a very easy means of correcting the static or dynamic unbalance of the system by adding or subtracting weight in the rim of the fly-wheel and obviates the necessity of adding counterweight to the crank cheeks, thereby simplifying the problem of either static or dynamic unbalance. The arrangement secures a mass balance since the reactions upon the crank shaft at opposite sides of its longitudinal center are equal and symmetrical.

By the term "dynamic balance" as herein used is meant the balancing of any number of couples in a revolving mass (which may be resolved into a single couple) by weights properly distributed (as for instance in the fly wheels) which form a resultant opposite couple.

What I claim as my invention is:—

1. In an engine, the combination with a crank-shaft having a plurality of pairs of throws in dynamic balance, of an engine casing in which said shaft is journaled, a fly-wheel at one end of the throws of said crank and within said casing, and a member at the opposite ends of the throws of said crank and within said casing of equal mass to said fly wheel to maintain the mass balance.

2. In an engine, the combination with a crank-shaft having a plurality of pairs of throws in dynamic balance, of an engine casing in which said shaft is journaled, and a pair of fly-wheels mounted on said crank-shaft at opposite ends of the throws thereof, said fly-wheels being equal in mass to maintain the mass balance.

3. In an engine, the combination with a crank-shaft having a plurality of pairs of throws in dynamic balance and with journals at opposite ends thereof, of an engine casing forming a housing for said crank-shaft provided with bearings for said journals, and a pair of fly-wheels mounted on said crank-shaft adjacent to said journals and within said housing, said fly-wheels being equal in mass to maintain mass balance.

4. In an engine, the combination with a crank-shaft having a plurality of pairs of throws in dynamic balance with journals at the opposite ends thereof, of an engine casing having a housing for enclosing said shaft provided with bearings for said journals, flanges on the end cranks adjacent to said journals, and fly-wheels having webs secured to said flanges, said fly-wheels being equal in mass to maintain mass balance.

5. In an engine, the combination with a crank-shaft having a plurality of pairs of throws in dynamic balance with journals at opposite ends thereof, an engine casing forming a housing for said crank-shaft and provided with bearings for said journals, flanges on the end throws adjacent to said journals, fly-wheels having web portions secured to said flanges adjacent to said bearings, and engaging shoulders on said webs and flanges concentric with the axis of the crank-shaft for aligning and centering said fly-wheels, the latter being equal in mass to maintain mass balance.

In testimony whereof I affix my signature.

LEONARD C. KENEN.